(12) United States Patent
Drucker et al.

(10) Patent No.: US 7,120,619 B2
(45) Date of Patent: Oct. 10, 2006

(54) RELATIONSHIP VIEW

(75) Inventors: Steven M. Drucker, Bellevue, WA (US); Curtis G. Wong, Bellevue, WA (US); Asta L. Glatzer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 576 days.

(21) Appl. No.: 10/420,414

(22) Filed: Apr. 22, 2003

(65) Prior Publication Data
US 2004/0215657 A1 Oct. 28, 2004

(51) Int. Cl.
*G06F 15/00* (2006.01)
(52) U.S. Cl. .................. 706/45; 706/11; 706/20; 709/203
(58) Field of Classification Search ............ 706/10–15, 706/18, 20, 45–50; 345/595, 607, 619, 625, 345/629, 639, 1.1, 1.2, 1.3, 902, 903
See application file for complete search history.

(56) References Cited

U.S. PATENT DOCUMENTS

| | | | |
|---|---|---|---|
| 5,749,081 A * | 5/1998 | Whiteis | 707/102 |
| 6,097,389 A * | 8/2000 | Morris et al. | 715/804 |
| 6,108,004 A * | 8/2000 | Medl | 715/804 |
| 6,246,793 B1 | 6/2001 | Rindtorff et al. | |
| 6,438,579 B1 * | 8/2002 | Hosken | 709/203 |
| 6,545,209 B1 | 4/2003 | Flannery et al. | |
| 6,546,405 B1 | 4/2003 | Gupta et al. | |
| 6,564,263 B1 | 5/2003 | Bergman et al. | |
| 6,578,040 B1 | 6/2003 | Syeda-Mahmood | |
| 6,850,954 B1 * | 2/2005 | Kawamae et al. | 707/104.1 |
| 6,934,917 B1 * | 8/2005 | Lin | 715/811 |

OTHER PUBLICATIONS

Chitra Dorai and Svetha Venkatesh. Bridging the Semantic Gap in Content Management Systems: Computational Media Aesthetics, 2001. 6 pages.

Thomas A. Phelps and Robert Wilensky. The Multivalent Browser: A Platform for New Ideas. Proceedings of the 2001 ACM Symposium on Document engineering, Nov. 2001, pp. 58-67.

Ian H. Witten, Rodger J. McNab, Stefan J. Boddie, and David Bainbridge Greenstone: A Comprehensive Digital Library Software System. Proceedings of the 5th ACM Conference on Digital Libraries, 1999. 9 pages.

Jeff E. Tandianus, Andrias Chandra, and Jesse S. Jin. Video Cataloguing and Browsing. Pan-Sydney Area Workshop on Visual Information Processing. Conferences in Research and Practice in Information Technology, vol. 11. Sydney, Australia. 2002. 7 pages.

* cited by examiner

*Primary Examiner*—Joseph P. Hirl
*Assistant Examiner*—Omar Fernández
(74) *Attorney, Agent, or Firm*—Amin & Turocy, LLP

(57) ABSTRACT

The present invention provides a unique method and user interface that facilitates accessing and browsing objects in which a user begins with a center object (e.g., one or a few focal objects) displayed on a screen and related objects are populated on the screen as well. The related objects can be further organized into clusters whereby each cluster or grouping of objects expands on a particular attribute of the center object. The attributes correspond to metadata. Thus, the objects are populated based upon the metadata of the center object. According to one aspect, the user can access one or more specific objects having a plurality of attributes and then relax at least one of the attributes to see what other objects share at least one attribute with the center object. According to another aspect, the object having the closest match to a search request can be centrally displayed with other close matches arranged by their respective metadata.

52 Claims, 12 Drawing Sheets

RELATIONSHIP VIEW

TECHNICAL FIELD

The present invention relates generally to browsing objects, and more particularly to displaying an initial object(s) and related objects which share metadata with the initial object(s) along multiple axes.

BACKGROUND OF THE INVENTION

As the availability of searchable objects (e.g., movies, music, photographs, e-mail, documents, text, word(s), phrase(s), files, video or sound cliplets, pictures, and/or messages) has increased, the task of effectively browsing and retrieving these objects has become difficult and cumbersome. Conventional systems for searching, browsing, modifying, sorting, and the like have provided limited ability for a user to access the objects in a meaningful manner.

For example, photographs digitally scanned onto a computer processor typically have nonsensical filenames associated therewith, making it difficult to manipulate and organize them. Providing more meaningful information to each file or media object must be done individually and separately which is time-consuming and tedious for regular or frequent use involving editing, sampling, and viewing, for example. Further, conventional browsing systems are typically rigid and thus limit a user's ability to personalize Such systems. Conventional searching/browsing methods also have limited options for providing and displaying results. Moreover, conventional browsing systems remain complex and incomprehensible for quick retrieval, use, and viewing of the objects while traditional methods remain stagnate and inadequate for today's user.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to an improved methodology that facilitates accessing and browsing focal objects and related objects based at least in part upon a set of criteria or attributes of the focal objects. One aspect of the invention involves focusing) down to a desired set of attributes (e.g., axes), wherein a focal or target object is displayed. One or more of the attributes (e.g., one or more axes) can then be relaxed to browse a plurality of other objects which can be related to the target object in at least one attribute. Further, such objects can be dynamically organized into clusters whereby each cluster shares a different attribute with the target object. Thus, the plurality of attributes of the target object can be individually represented in respective clusters (or objects), thereby allowing a user to see and/or browse objects that are "in the neighborhood" of the target.

In particular, there are two complementary approaches for browsing information spaces. One approach involves browsing and/or searching a large set of initial objects (e.g., all employees, e-mail, movies, etc.) whereby metadata associated with the respective objects are employed to filter a population of appropriate matches, thus progressively decreasing the number of matching objects to a manageable number. This approach facilitates rapidly finding a single target object (e.g., letter created today by John and addressed to Sue Smith concerning lawsuit) and/or multiple target objects (e.g., all emails from John received this month) from the large set of initial objects using the metadata associated with the respective objects.

A second and complementary approach operates in an opposite fashion. With this approach, a user begins with a smaller set of initial object(s) (e.g., one or a few objects) having metadata associated therewith such that the initial object(s) is displayed with one or more clusters of objects. The one or more clusters of objects share metadata with the initial object(s) along a plurality of different axes. For example, an object of focus such as a photograph is centrally displayed on a screen while any suitable number of clusters of photographs is displayed in the peripheral areas of the screen. Each of the clusters of photographs shares metadata with the object of focus along several different axes. While browsing through any one cluster of photographs, a user can select any object therefrom to make the selected object a new object of locus. Another set of peripheral clusters could then be displayed in a similar manner. New objects can be selected to be the focus and new clusters can be populated according to the metadata shared with the current object of focus.

Moreover, clusters can be based on a variety of attributes including information gleaned from collaborative filtering such as what other users selected, liked, searched for and/or browsed through. The display and/or arrangement of the clusters facilitate a user to browse along different and/or tangential axes that are related to the initial axis. For instance, the user can begin browsing Julia Roberts movies and end Up looking at Burt Bacharach music.

As briefly discussed supra, the invention employs metadata such as during browsing and searching among and through various objects. Metadata can include intrinsic metadata (e.g., creation date, content type, size, modification date . . . ) as well as extrinsic metadata (e.g., human description of the content). Intrinsic metadata can be extracted from and associated with the item. Extrinsic metadata can be generated based at least in part by user instructions as well as by an analysis of the items via pattern recognition, speech recognition, content analysis, face detection and the like. Further, the extrinsic metadata can be propagated in a hierarchal arrangement, thereby facilitating browsing, displaying, and/or searching of the objects.

Metadata can be pre-appended to the respective objects and/or can be extracted from a cluster of objects and then appended thereto. This permits personalization and customization of the browsing techniques and further facilitates browsing and/or searching among clusters of objects. Furthermore, the metadata as described herein can facilitate demonstrating and viewing relationships and/or degrees of separation between objects. That is, by having a set of items populated based on the metadata of the center item and viewed together with the center item, the user is able to focus on a center item while also looking at other items (clusters) which are each independently related in part to the center item.

Another aspect of the subject invention employs artificial intelligence systems to facilitate browsing, clustering and displaying of various objects based at least in part upon historical data relating to the objects, browsing preferences, and the like. This facilitates automatic and timely displaying and browsing objects, including new objects added to one or more object data stores. The browsing and/or clustering mechanisms can be trained to automatically search for related new objects in the object data store and process them according to previously set annotation and cluster parameters.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
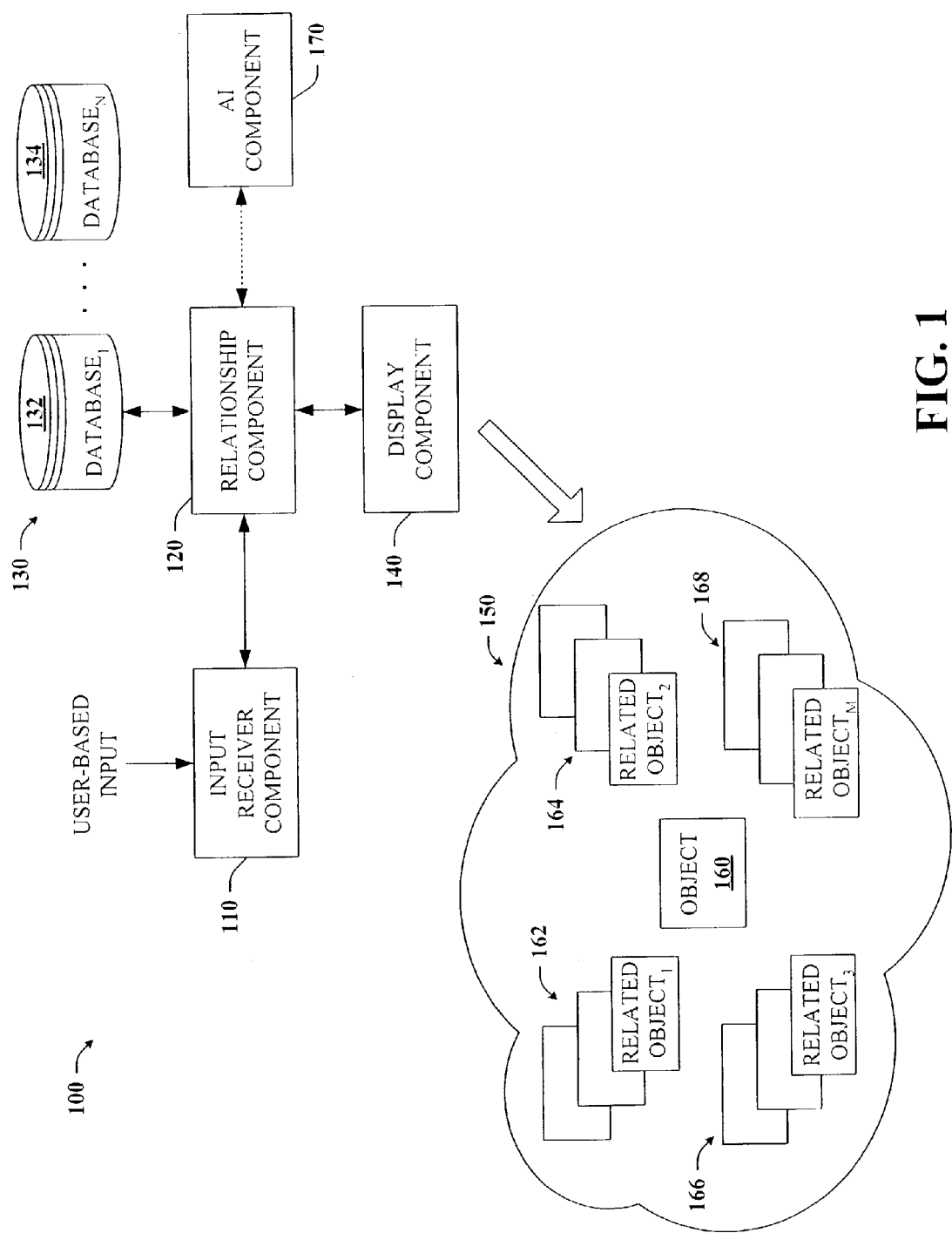
FIG. 1 is a general block diagram of an exemplary system that facilitates browsing and searching of objects and objects related thereto in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

In addition, the term "object" as employed in this application is intended to refer to pictures, photographs, music, sounds, text, e-mail, movies, video, messages, documents, slides, movie or video stills, streaming video and/or audio, and/or any combination thereof and/or any cliplet thereof, and in any suitable format or file type for carrying out the subject invention.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Accordingly, the subject invention (e.g., in connection with accessing, browsing, and/or clustering objects) can employ various artificial intelligence based schemes for carrying out various aspects of the subject invention. For example, clustering objects can be facilitated via an automatic clustering and/or grouping process. Such clustering and/or grouping can employ a probabilistic and/or statistical-based analysis (e.g. factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information . . . ) so that the classifier(s) automatically annotates, files, groups, clusters, and merges media items in accordance with user preferences. For example, with respect to Support Vector Machines (SVM) which are well understood, it is to be appreciated that other classifier models may also be utilized such as Naive Bayes. Bayes Net, decision tree and other learning models. SVM's are configured via a learning or training phase within a classifier constructor and feature selection module. A classifier is a function that maps an input attribute vector, x=(x1, x2, x3, x4, xn), to a confidence that the input belongs to a class; that is f(x)=confidence(class). In the case of text-based media classification, for example, attributes are words or phrases or other domain-specific attributes derived from the words (e.g., parts of speech, presence of key terms), and the classes are categories or areas of interest (e.g., levels of priorities).

Referring now to FIG. 1, there is illustrated a general block diagram of a system 100 that facilitates browsing and viewing among objects and other objects related thereto based at least in part upon user input. The system 100 comprises an input receiver component 110 that receives an input regarding an object or primary object. The input component 110 communicates the input (e.g., primary object) to a relationship component 120 which is coupled thereto. The relationship component 120 receives information about the primary object from the input component 110. The relationship component 120 can access related objects from one or more databases 130 (e.g., individually referred to as DATABASE$_1$ 132 and DATABASE$_N$ 134, where N is an integer greater than or equal to one) also coupled thereto via employment of metadata. That is, metadata associated with the primary object is received by the relationship component 120. The relationship component 120 can search and access other objects having metadata related at least in part to the metadata of the primary object.

For example, imagine that the primary object has metadata A, B, C, D, and E associated therewith. The relationship component searches and accesses other objects having at least one of A, B, C, D, and E metadata. The accessed objects can have as few as one piece of metadata in common with the primary object. Alternatively, the accessed objects can have any combination of the A, B, C, D, and E metadata.

The related objects as well as the primary object can be displayed by a display component 140 coupled to the relationship component 120. The display component 140 can render the primary object and the related objects. An exemplary display 150 via the display component 140 comprises a focal object 160 (e.g., primary object) and a plurality of related objects surrounding the focal object 160. The related objects can be organized into groups (e.g., RELATED OBJECTS$_1$ 162, RELATED OBJECTS$_2$ 164, RELATED OBJECTS$_3$ 166, and RELATED OBJECTS$_M$ 168, where M is an integer greater than or equal to one) according to the metadata shared in common with the focal object 160.

Optionally, the system 100 can include an artificial intelligence (AI) component 170 operatively coupled to the relationship component 120. The relationship component 120 can employ the AI component 170 to automatically determine which objects are related to the primary object based at least upon one or more inferences. The inferences can be based in part upon explicit training of classifier(s) (not shown) before employing the system 100 or implicit training based at least upon a user's previous actions, commands, instructions, and the like during use of the system 100. The AI component 170 can employ any suitable scheme (e.g., neural networks, expert systems, Bayesian belief networks, SVMs, Hidden Markov Models, frizzy logic, data fusion, etc.) in accordance with implementing various automated aspects of the subject invention. More particularly, the AI component 170 can facilitate determining and/or inferring a most appropriate set of related objects to display in connection with the primary object. The AI component can factor historical data, extrinsic data, context, data content, state of the user and can compute environmental state, cost of displaying incorrect objects (e.g., least related or lesser degree of relatedness) versus benefits of displaying desired objects (e.g., most related or higher degree of relatedness), utility analysis, and the like.

Moreover, the system 100 can employ explicitly trained as well as implicitly trained classifiers in connection with inferring desired objects to expose to the user. For example, the system 100 can be explicitly trained by watching a user over time (e.g., any suitable time period) to learn how the user likes to organize, arrange, and view primary as well as related objects and thus automatically provides such organization and/or arrangements to the user based upon the training.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 2:
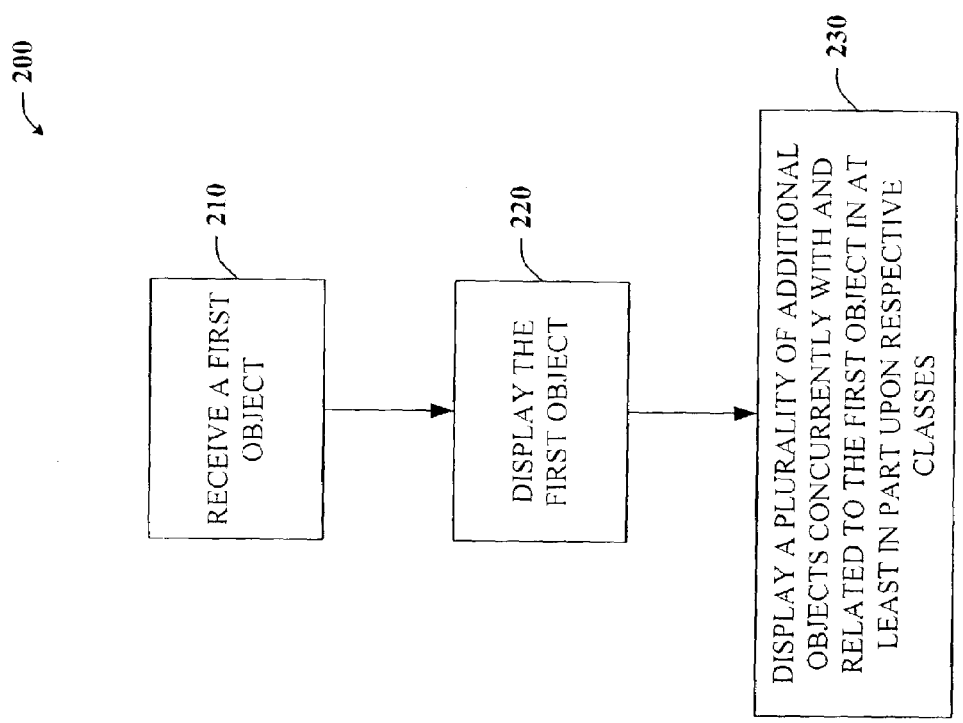
FIG. 2 is a flow chart illustrating an exemplary methodology that facilitates searching and browsing objects in accordance with an aspect of the present invention.

Referring initially to FIG. 2, there is illustrated a low diagram of an exemplary methodology 200 that facilitates accessing objects in accordance with an aspect of the present invention. The methodology 200 begins at 210 wherein a first object is received. The first object can be received from a database such as by a user-based search request, for example. The first object can have any suitable number of attributes or metadata (e.g. either system or user annotated) associated therewith. At 220, the first object is displayed in the center of a display screen, for example. At 230, a plurality of additional objects which are related to the first object can be concurrently displayed with the first object.

The additional objects are related to the first object by respective metadata or classes of metadata associated with the objects. That is, the additional objects share one or more metadata in common with the first object. Furthermore, the additional objects can be grouped and/or clustered by their respective metadata (e.g., same author, movies, books, etc.) Such that one or more groups and/or clusters of objects are arranged around or peripheral to the first object. Each additional object and/or cluster of objects displayed can have additional metadata associated therewith. This facilitates browsing objects related to the first object according to one or more attributes of the first object.

The above methodology can be repeated to continue accessing and browsing objects. For example, to continue browsing among objects related to the first object, a user can select an object in one of the displayed clusters. Thus, a new first object is received and displayed in the center of the screen. Again, this new first object comprises one or more metadata. New additional objects or clusters thereof having metadata in common with the new first object are populated in peripheral areas of the screen. Hence, the user can determine an Nth degree of separation (e.g., N is an integer greater than or equal to one) between objects as the methodology is repeated.

In practice, for example, the first object received and displayed can be an image of a record cover for Elton John's Greatest Hits Vol. 1 (referred to as "Elton John record"). The record comprises a plurality of metadata such as, for example, singer, songwriter, copyright, record label, and producer. Additional objects having at least one metadata in common with the Elton John record are arranged in respective groups or clusters around the record cover. Examples of the additional objects include other records by Elton John (e.g. singer metadata), other singers who have collaborated with Elton John (e.g., singer metadata), other records produced by the same record label (e.g., producer and/or record label metadata), and movies which have included at least one song by Elton John on its soundtrack (e.g., singer metadata). Each of these objects also has other metadata associated therewith. Thus, a user who initially searched for Elton John's Greatest Hits Vol. 1 can now browse through a number of other objects that are related to the Elton John record according to at least one attribute of the Elton John record by an Nth degree of separation.

Moreover, the present invention allows a user to initially focus down to a narrow set of attributes (e.g., the first object) and then broaden out to related but more generalized attributes. After drilling down to a specific set of attributes, one or more of those attributes can be relaxed by user preferences, thereby allowing the user to browse other objects in the neighborhood of the first object. For instance, the user can see what is "next door" to the first object without specifically searching for (e.g., by user-based search request) and/or actually knowing what is next door. Unlike conventional search/browse systems and mechanisms that require the user to have specific information in order to locate a desired object, the user can easily and quickly find his/her desired objects by continuously browsing among related objects via metadata trees in the above described manner while having only bits of information at hand.

Figure 3:
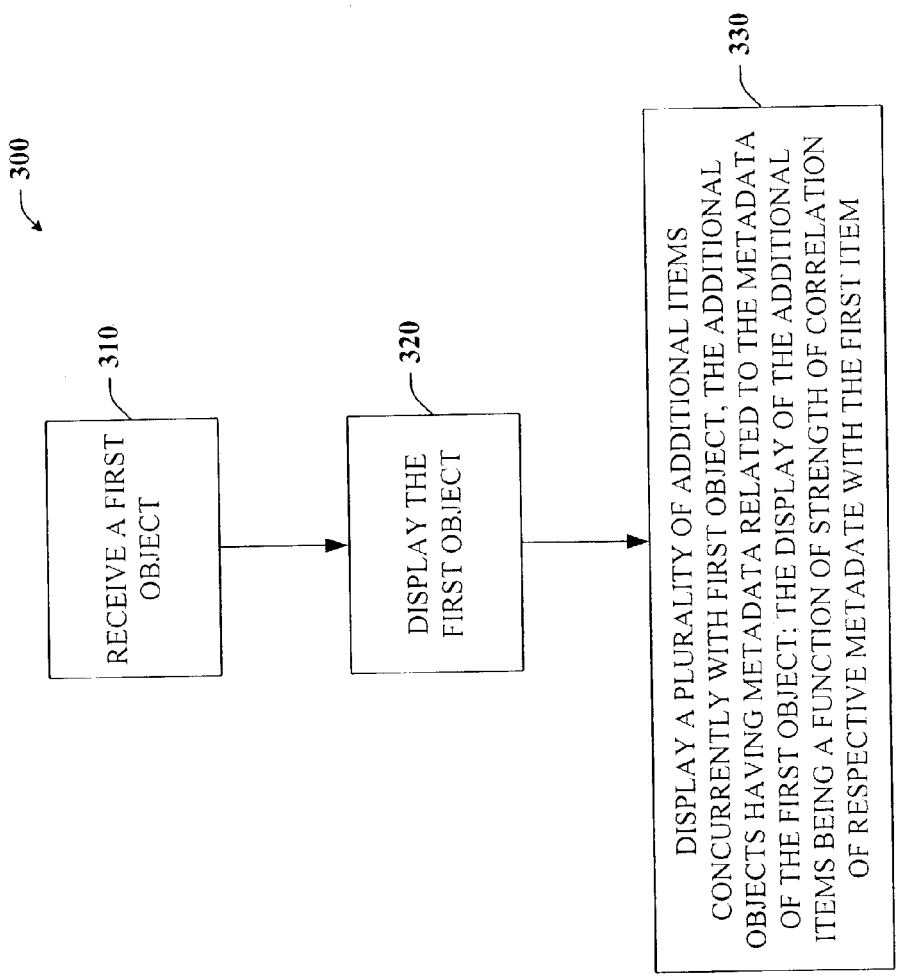
FIG. 3 is a flow chart illustrating an exemplary methodology that facilitates accessing and browsing objects in accordance with an aspect of the present invention.

Referring now to FIG. 3, there is illustrated a flow diagram of an exemplary process 300 that facilitates browsing and accessing objects in accordance with an aspect of the present invention. The process 300 can begin with receiving a first object at 310 from one or more databases. The first object 310 has metadata associated therewith and can be received for example by a user-based search request mechanism. Other mechanisms can also be employed to receive the first object.

One approach to the process 300 involves performing a non-specific search request using one or more attributes (metadata) such as when the desired object is not known. For example, when a user would like to find a particular book title written by Stephen King or one of his other pseudonyms published in the 1990's but does not know the title of the book, the author, and/or the year it was published, a user can enter one or more non-specific search terms in order to retrieve an object somewhat related to or in the neighborhood of the desired object (e.g., book cover/title). Thus, at 320, a cover of a book entitled "The Stand" published in 1990 and authored by Stephen King is centrally displayed to the user. At 330, a plurality of additional objects (e.g., book titles, movies, websites, news articles, etc.) having respective metadata associated therewith. The respective metadata of the additional objects are at least in part related to the metadata associated with "The Stand" are displayed peripheral to "The Stand" book cover.

The additional objects selected to be displayed are a function of strength of correlation of respective metadata with the metadata associated with "The Stand" book cover (e.g., first object). Metadata associated with the first object can be weighted to determine the strength of correlation between the first object and other objects selected for clustering. The weight of each metadata associated with the first object can be determined based at least in part upon user input (e.g., via a user-based search request).

In one aspect of the present invention, objects having the strongest correlation to the first object in terms of their respective metadata are displayed. For example, other Stephen King books published in the 1990's are displayed since they strongly correlate to the first object (e.g., "The Stand" book cover). However, Stephen King books published prior to 1990 or after 1999 may not be displayed since the correlation of metadata with respect to the first object is relatively weaker. Other examples of objects having a relatively strong correlation with "The Stand" metadata (e.g., order of weight heaviest to lightest: Stephen King, author, publisher, date, title, genre) can include clusters of other Stephen King books (e.g., book covers) published in the 1990's; books written under King's pseudonym Richard Bachman in the 1990's; movies based on Stephen King novels; other novels in the Richard Bachman genre; other novels in the Stephen King genre; and/or other novels in a similar genre published by the same publisher. Hence, other novels in a similar genre published by the same publisher would exhibit the weakest correlation with respect to the clustered objects displayed.

According to another aspect, location or placement of an object or cluster of objects with respect to the first object (e.g., center of focus) can be a function of the correlation of its respective metadata with the first object metadata. Still referring to the example above, other Stephen King books written in the 1990's can have a more proximate location with respect to the first object than movies based on Stephen King books. Similarly, a depth location and/or size of the cluster objects can vary based at least in part upon a correlation of the respective metadata with the first object metadata. Thus, objects corresponding to books written by King's pseudonym and published in the 1990's can appear larger in size and/or at a lesser depth than objects corresponding to books of a similar genre as King which were published in the 1990's.

Another form of a non-specific search request can entail even less known information. For example, a user might want to see everything that happened around Thanksgiving last year. The object having the closest match (in terms of metadata) to the request can be centrally displayed with other close matches appropriately arranged by their respective metadata around the center object. For example, closer matches can be located closer to the central object. Moreover, accessing and browsing objects in this manner facilitates refining searches visually rather than through only typed word or phrase entries.

A second approach involves conducting a search request using more specific information and/or metadata. In particular, a user can select or request access to a particular object to be displayed, thereby focusing on the particular object and/or its associated metadata. For example, a user wants to see, browse, and/or access all photograph objects created up to two weeks before and/or up to two days after Dec. 25, 2002 that include Mom therein. Objects having metadata such as date metadata (e.g., creation date from Dec. 11 through Dec. 27, 2002; Dec. 25, 2002) and "mom" metadata can be accessed and displayed to the user.

Thus, the user specifically searches for photographs which are associated with the specified date range, "Dec. 25, 2002", and "mom". A first photograph P comprising the "Dec. 25, 2002" and "mom" metadata is centrally displayed as a center of focus. Additional photographs including "mom" created within the specified date range are populated in the display area peripheral to the center photograph. Such additional photographs that have common metadata can be grouped into one or more clusters. For example, a first cluster comprises all photographs that include mom and dad with a Dec. 20, 2002 creation date and a second cluster includes all photographs with mom, brother, and sister with a Dec. 26, 2002 creation date. Any suitable number of cluster formations can be populated depending on the available display real estate as well as user preferences.

Because the photographs in the clusters can comprise other metadata, any one of these photographs could be selected as a new center of focus to thereby facilitate browsing through one or more related branches of metadata. For instance, the user selects a photograph $P_1$ of mom and dad (metadata) to be the new center of focus. Accordingly, new clusters of photographs and/or other objects having metadata in common with the new center of focus are populated peripheral to the center of focus. Previously displayed clusters are removed from the display and/or can be saved in a historical component. The cluster from which the new center of focus was selected is kept on the display in order to preserve context.

Moreover, once a first object is displayed, the screen is populated with one or more additional objects (or clusters of objects) which share at least one attribute of relative strength with the first object, thereby allowing the user to browse through objects that are nearby, next to, and/or related to the first object. Further, location of the clusters can be indicative of the relationship between the first object and the respective clusters. Hence, the present invention provides suggestion to the user thereby mitigating a need for user-based advanced search skills.

Figure 4:
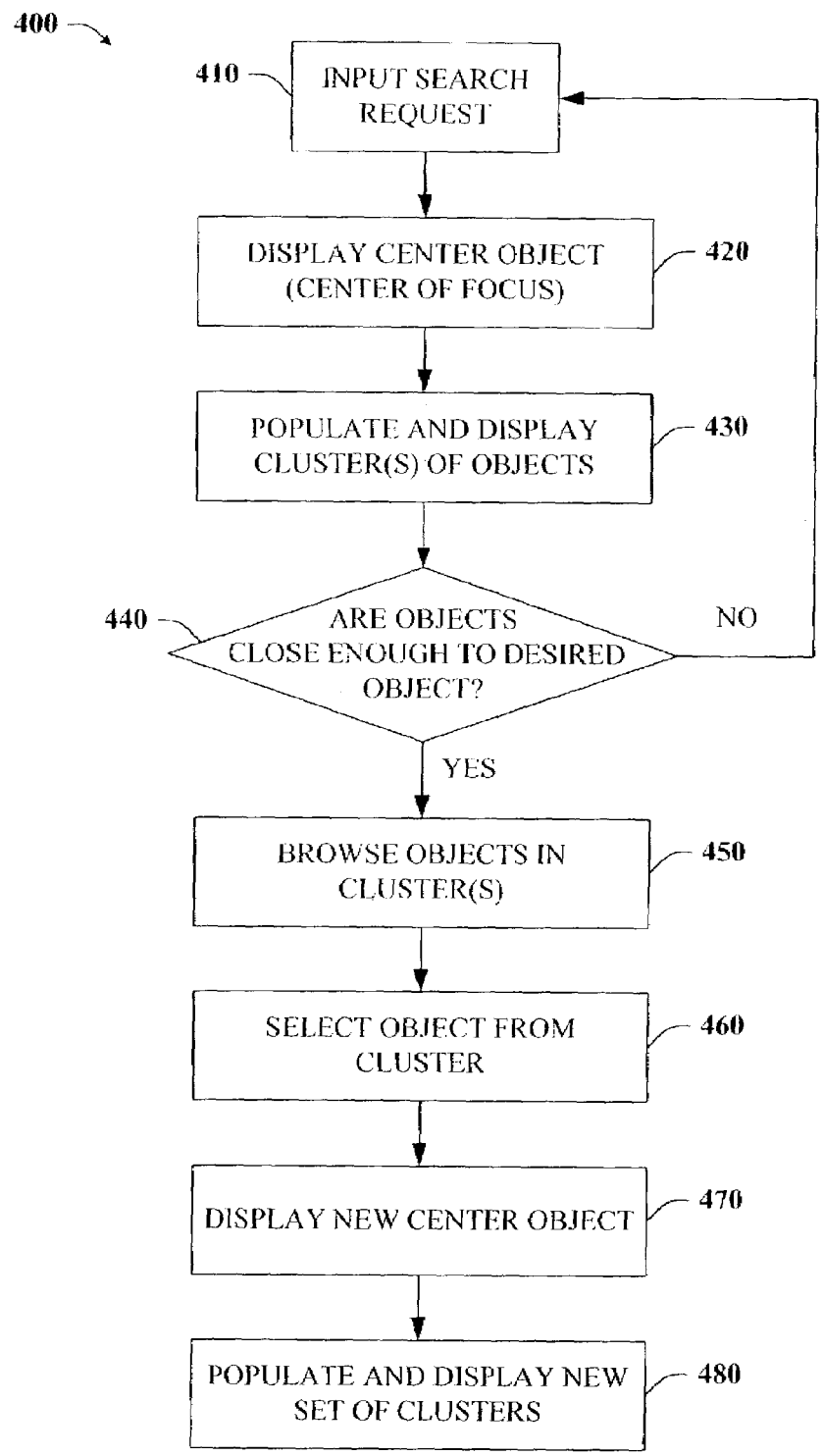
FIG. 4 is a flow chart illustrating an exemplary process for browsing objects in accordance with an aspect of the present invention.

Turning to FIG. 4, there is demonstrated an exemplary flow diagram of a process 400 that facilitates accessing and/or browsing objects in accordance with an aspect of the present invention. For example, a user can input a search request at 410. The search request can access one or more available databases. One object having the closest match to the search request is displayed centrally on a user interface screen at 420. At 430, one or more clusters or groups of objects related (in terms of metadata) to the center object are populated around the center object either in a random order or as a function of strength of correlation of metadata, thus varying in location, depth location and/or size.

At 440, the user can visualize the objects and/or cluster(s) and determine whether the objects displayed are close enough to what s/he desired. If the determination is no, then the user can input a new search request at 410. Alternatively, the user can perform at least two searches that produce different results, the intersection of which can yield the user's desired object.

However, if the determination is yes, then the user can browse the objects in the cluster(s) at 450. An object within one of the cluster(s) can be selected at 460 to become a new center object at 470. Selecting a new center object results in at least partially modifying the focus of the browsing. That is, changing the center object automatically causes new and/or different cluster(s) to be populated and displayed around the new center object, such as at 480.

Moreover, clusters of objects are populated dynamically with respect to the current center object and according to the metadata associated with the center object. This dynamic clustering of objects facilitates simple and fast visual browsing of objects, thereby mitigating the need for advanced search skills. The process 400 can essentially be repeated as desired by the user.

Figure 5:
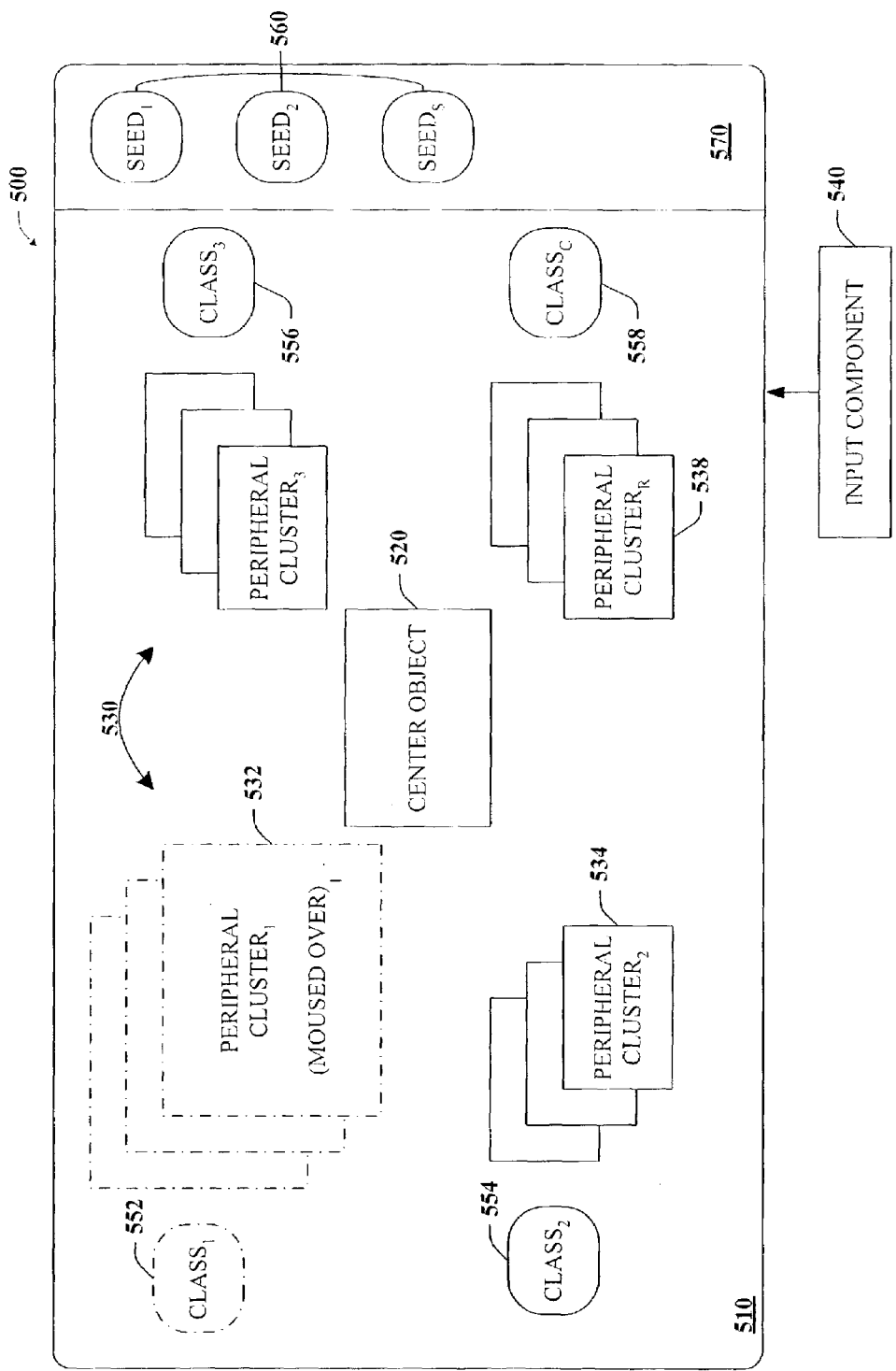
FIG. 5 is a block diagram of an exemplary user interface for browsing objects in accordance with yet another aspect of the present invention.

Referring to FIGS. 5-8, general block diagrams of various exemplary user interfaces that facilitate accessing and browsing objects are illustrated in accordance with the present invention are shown. FIG. 5 depicts one such exemplary user interface 500 for accessing and browsing objects. The user interface comprises a window display 510 that displays a center object 520 and one or more peripheral clusters 530 related thereto (individually referred to as PERIPHERAL CLUSTER$_1$ 532, PERIPHERAL CLUSTER$_2$ 534, PERIPHERAL CLUSTER$_3$ 536, and PERIPHERAL CLUSTER$_R$ 538, where R is an integer greater than or equal to one). The viewable size of the center object 520 and the peripheral cluster(s) 530 is limited by the available display real estate as well as by the physical dimensions of the display screen. Although four peripheral clusters are depicted in FIG. 5, it should be appreciated that any suitable number of clusters can be populated and employed to carry out the present invention.

The center object 520 can have a plurality of metadata attached thereto. The one or more peripheral clusters 530, which have metadata related to the center metadata, are displayed around the center object 520 wherein the location, depth location, and/or relative size of each cluster may be a function of strength of correlation of its metadata relative to the center metadata. In particular, each cluster 530 comprises one or more objects wherein each object has metadata similar or related to the center metadata. The cluster metadata can have a plurality of classes 550 such that the clusters 530 are defined by the respective classes 550 (denoted as CLASS$_1$ 552, CLASS$_2$ 554, CLASS$_3$ 556, and CLASS$_C$ 558, where C is an integer greater than or equal to one).

For example, imagine browsing movie titles where the center object 520 is Top Gun. The clusters 530 could include a Tom Cruise cluster 532 (comprising other Tom Cruise movies), a jet-fighter cluster 534 (comprising other movies with jet-fighting scenes, books on jet-fighting, books on jet fighters), a Tony Scott cluster 536 (comprising other movies, projects, plays directed by or involving Tony Scott), and a records cluster 538 (comprising records of artists whose songs appeared on the Top Gun soundtrack). Other potential clusters could include a news cluster (comprising news articles about Top Gun, Tom Cruise, Val Kilmer, Tony Scott, Kelly McGillis, and/or other big 80's movies) and any other cluster populated with objects sharing metadata with the Top Gun metadata.

According to the foregoing example, the center metadata involves several aspects of the movie Top Gun. These aspects or classes define the respective clusters. The one or more classes 550 readily identify each cluster of objects and implicitly demonstrate how each cluster 530 is related to the center object 520. As shown in FIG. 5, the class 550 for each cluster 530 can appear adjacent to each respective cluster 530.

It should be appreciated that a metadata class can also be a metadata object depending on the context of objects being browsed. For instance, imagine that the center object 520 is a picture of Julia Roberts. In this instance. "Julia Roberts" is the center object metadata. However, in another instance, the center object 520 is a movie cover for Runaway Bride. In this case, "Julia Roberts" would be a metadata class defining a cluster comprising all of her movies (e g., each object in the cluster corresponds to one of her movies).

In practice, the center object 520 on display can result from a user-based search that is narrow or broad wherein either search comprises inputting or selecting one or more metadata terms (e.g., attribute(s)) to facilitate accessing and browsing one or more desired objects. For example, an input component 540 receives a search request for a journal article entitled Banana Crops: The Next Generation written by Jane Smith on Jul. 7, 2002. One or more databases (not shown) can be accessed during such a search. The search can result in the center object being the front page of such article. Alternatively, a search request for attributes such as journal articles on the topic of genetically modified fruit written in July 2002 can yield a similar result. This similar result is based at least in part upon whether the metadata attached to such article has the strongest and/or closest match to the metadata/attributes contained in the search request.

To provide alternative or additional pathways for a user to browse, one or more seeds 560 (e.g., SEED$_1$, SEED$_2$, and SEED$_S$, where S is an integer greater than or equal to one) can be listed in a seed display panel 570 of the user interface 500. The seeds also relate to the center object 520 according to metadata extracted from at least the center object. Metadata can also be extracted from the clusters to populate the seeds 560. In one example, the user decides to shift from browsing agricultural journal articles to browsing medical journal articles. By selecting (e.g., clicking) the appropriate seed 560 in the seed display panel 570, a new center object would appear along with new peripheral clusters which are appropriately related to the new center object. The new center object should exemplify the selected seed.

Peripheral clusters 530 can be browsed by positioning a mouse or pointer component (not shown) over the desired cluster 530. The cluster can have an elliptical shape (described infra in FIGS. 7 and 8) Such that as the mouse is positioned over the cluster, the objects in the cluster rotate in an elliptical or otherwise circular motion. When a peripheral cluster 530 such as PERIPHERAL CLUSTER$_1$ 532 is moused over, the cluster 532 is enlarged with respect to the remaining clusters 534, 536, and 538 to make better use of screen real estate. Thus, objects within the moused over cluster 532 are easier to view by the user.

When an object within a peripheral cluster 530 is selected by the user, the cluster 530 is moved to the upper left corner, for example, so that context is consistently preserved. The selected object is moved to the center of the display 510 and becomes the new object of focus. The previous center object is removed from the display along with the other corresponding clusters. As new center objects and new peripheral clusters are populated, one or more seeds 560 in the seed panel 570 also adapt and change dynamically according to the new center object and peripheral clusters. The seeds 560 can be represented by icons illustrative of the respective seed. Thus, the peripheral contents (e.g., 530, 550, and 560) and the organization thereof on the display 510 dynamically change coincident with the center object 520.

It is to be appreciated that user-based search/selection input (e.g., to facilitate accessing, browsing, and/or clustering the objects) is intended to include instructions provided via classifier(s) (e.g., explicitly and/or implicitly trained). Accordingly, as object(s) are received into one or more databases (not shown) and/or populated into cluster(s), an annotation mechanism and/or system can annotate the object(s) and cluster the objects, respectively, based at least in part upon employment of a classifier(s). Thus, a properly tuned classifier can greatly facilitate working with the object(s) in accordance with the subject invention.

Figure 6:
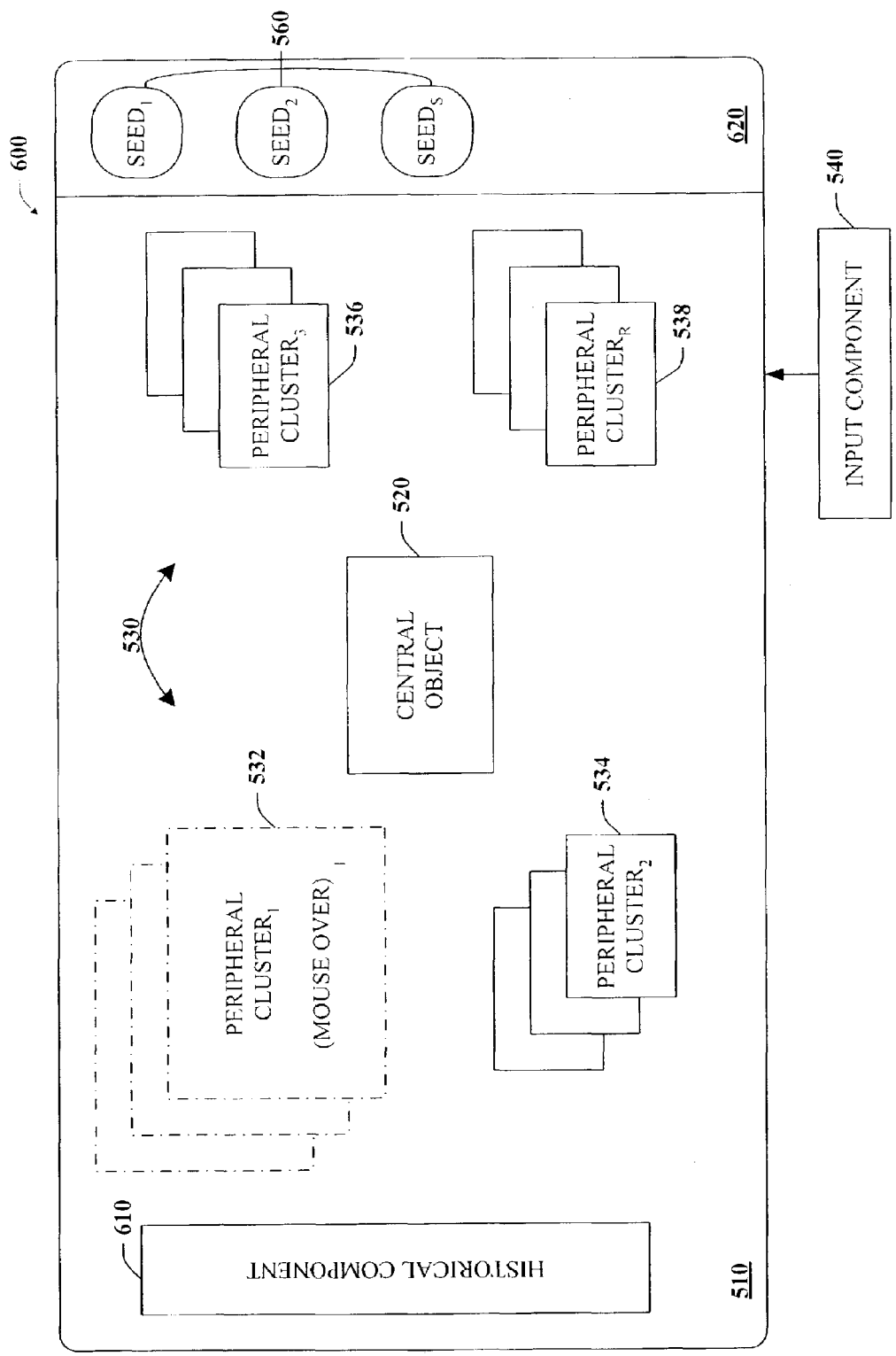
FIG. 6 is a block diagram of an exemplary user interface for browsing in accordance with still another aspect of the present invention.

FIG. 6 is very similar to FIG. 5, however, an additional component is depicted in FIG. 5. In addition to the features described above, FIG. 6 also comprises a historical component 610. The historical component comprises previously displayed center objects for any suitable period of time to provide a means for quick recall of such objects (e.g. center object and related cluster objects). It can also provide context to an ongoing and/or lengthy browsing session. In addition, the historical component 610 can be programmed to formulate statistical information, to extract metadata therefrom, and to analyze common themes and/or trends among the objects in the historical component 610. Thus, a user can track what objects and/or clusters have been previously focused on and/or browsed. The historical component as well as a seed panel display 620 can be minimized to make better use of screen real estate while browsing the clusters 530.

Figure 7:
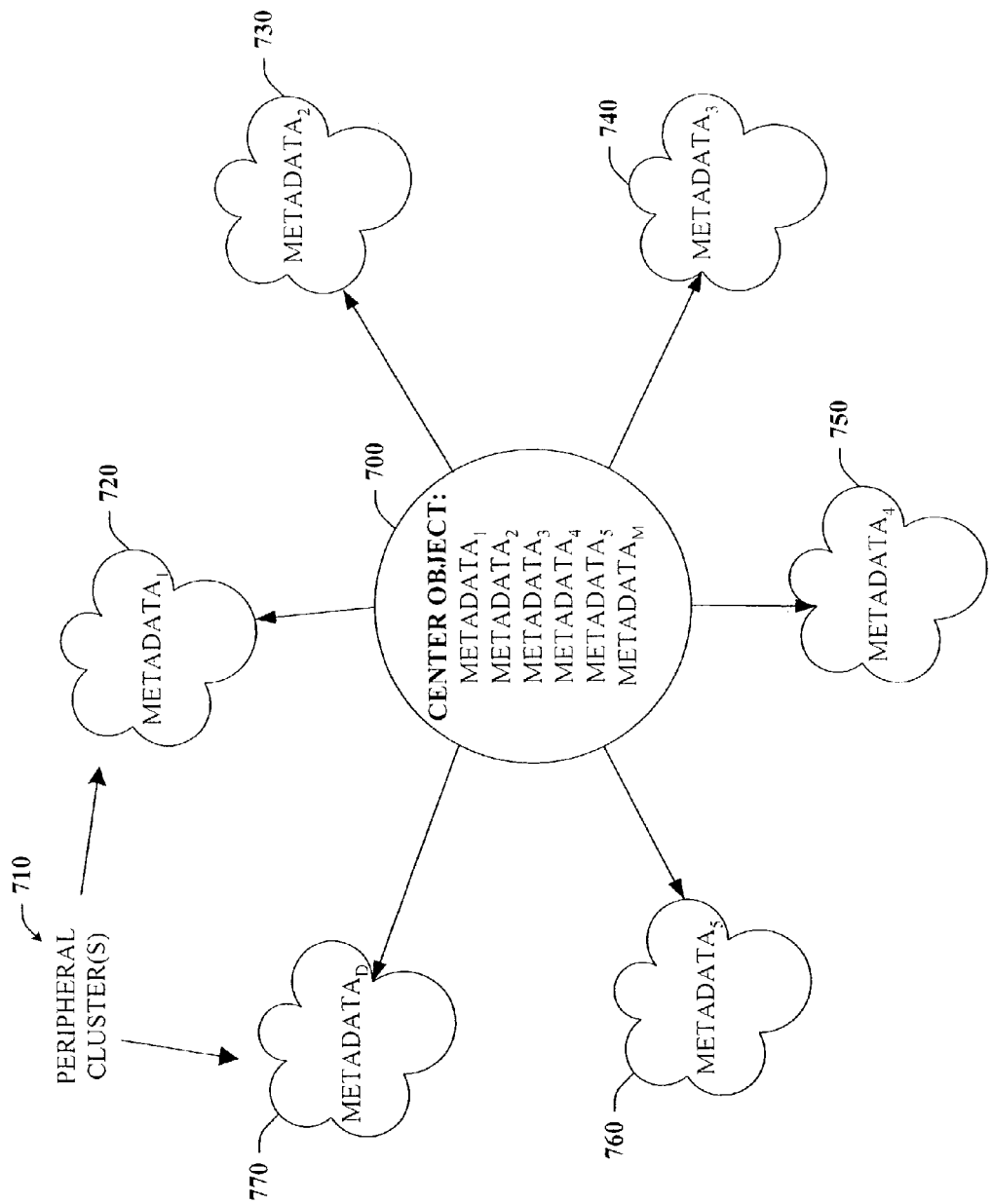
FIG. 7 is a block diagram illustrating a relationship between browsing a center object and related peripheral clusters of objects in accordance with an aspect of the present invention.

Referring now to FIG. 7, there is a schematic diagram of a relationship between a center object 700 and one or more peripheral clusters 710 (collectively 710) in accordance with an aspect of the present invention. The center object 700 comprises one or more metadata such as METADATA$_1$, METADATA$_2$, METADATA$_3$, METADATA$_4$, METADATA$_5$, and METADATA$_M$, wherein M is an integer greater than or equal to one. The one or more peripheral clusters 710 are populated upon the selection and/or display of the center object 700. Thus, each peripheral cluster can be populated with one or more objects wherein each object has at least one metadata in common with the center object 700. As shown, cluster 720 comprises objects having metadata$_1$, cluster 730 comprises objects having METADATA$_2$, cluster 740 comprises objects having METADATA$_3$, cluster 750 comprises objects having METADATA$_4$, cluster 760 comprises objects having METADATA$_5$ and cluster 770 comprises objects having METADATA$_M$. Although each cluster 710 is demonstrated as having one metadata in common with the center object 700, each cluster can have more than one metadata in common with as well as other metadata not in common with the center object 700.

New metadata associated with each cluster and its objects can also be extracted therefrom and then attached (via an annotation mechanism) to the individual objects. Thus, objects can have user-annotated metadata (e.g. extrinsic metadata), system annotated metadata (e.g., intrinsic metadata), and/or third party-annotated metadata (e.g., by professionals—extrinsic and/or intrinsic metadata).

Figure 8:
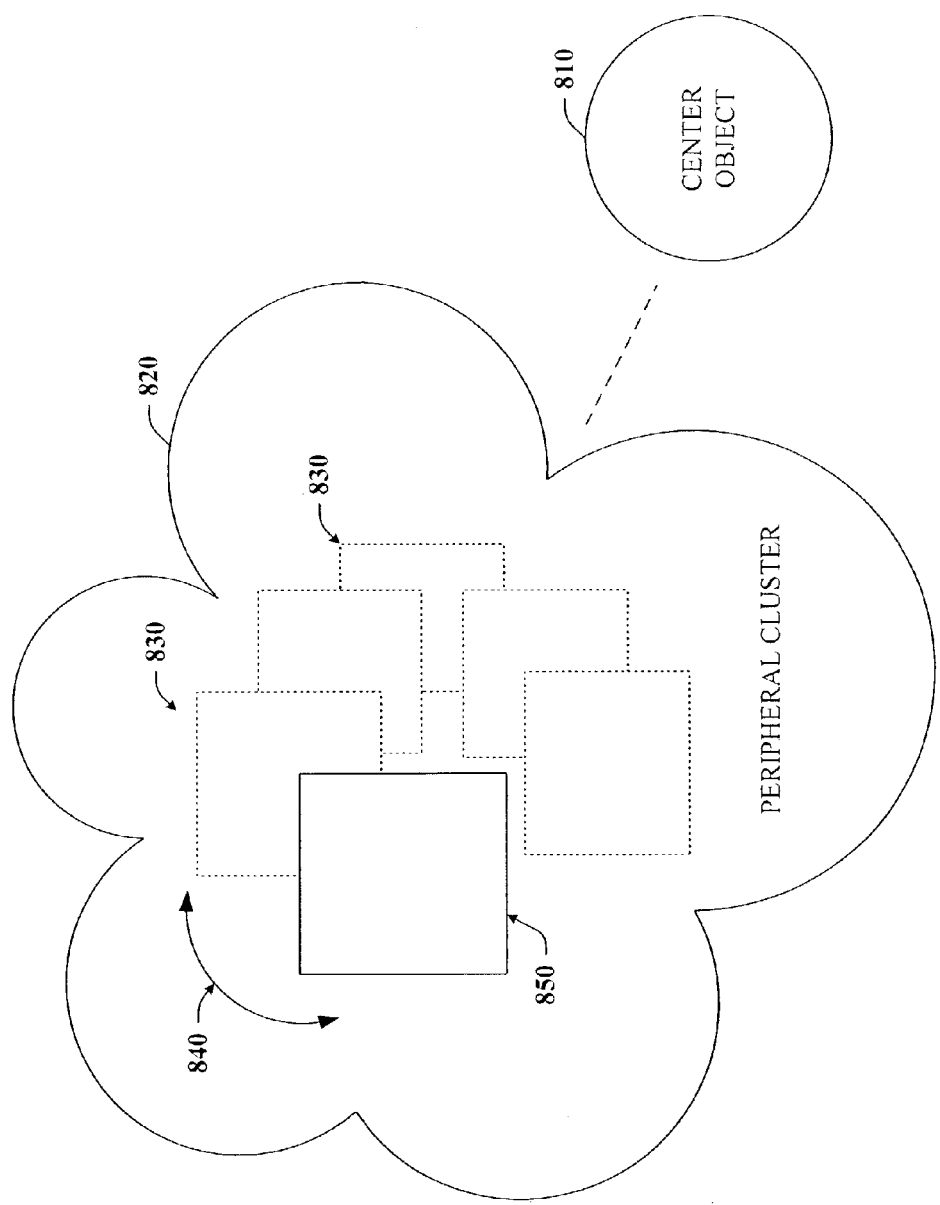
FIG. 8 is a block diagram of a relationship between a center object and its related peripheral objects in accordance with an aspect of the present invention.

FIG. 8 depicts a closer view of the diagram illustrated in FIG. 7. In particular, a center object 810 is displayed centrally with respect to at least one cluster 820 located peripherally thereto. The cluster 820 comprises one or more objects 830 arranged in an elliptical or otherwise circular formation such that when a mouse or pointer is positioned thereover, the objects 830 rotate either in a forward motion 840 or a backward motion (not shown), depending on the position/location of the mouse. A front-most object 850 is highlighted (e.g., such as by a different color line around the object—shown with solid line) indicating that it can be selected to become a new center object. The objects behind the front most object 850 gradually blend or fade into the background (shown with dotted line), thus enhancing the visual contrast between the front most object 850 and all other objects 830 in the cluster 820.

Figure 9:
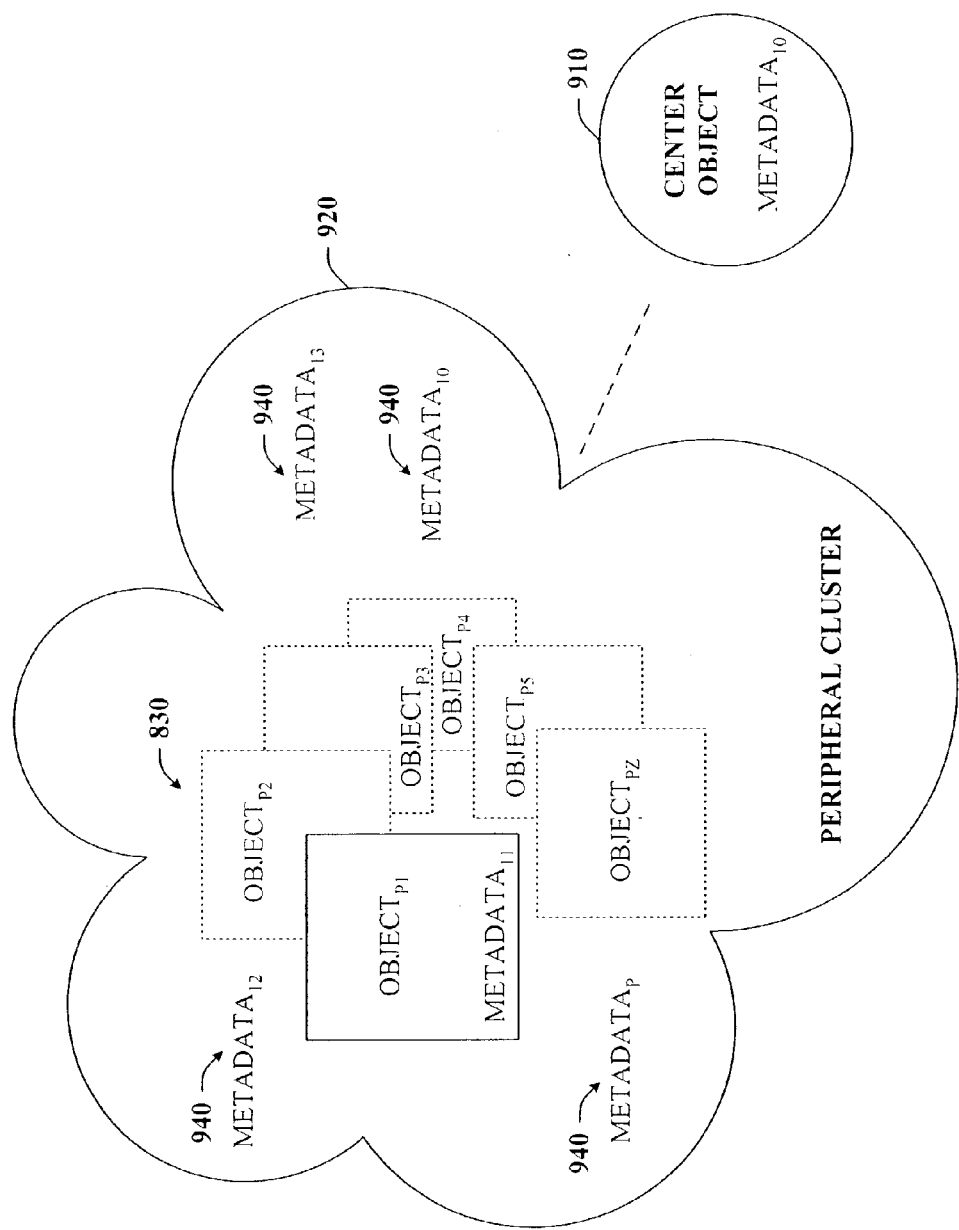
FIG. 9 is a block diagram of a relationship between a center object and its related peripheral objects in accordance with an aspect of the present invention.

FIG. 9 demonstrates a more detailed view of the diagram of FIG. 8. In FIG. 9, a center object 910 is illustrated as having at least one metadata (e.g., metadata$_{10}$) associated therewith. At least one peripheral cluster 920 is represented as having a plurality of objects 930 and a plurality of metadata 940 (floating in the cluster 920) associated therewith. In particular, the objects 930 (e.g., object$_{P1}$, object$_{P2}$, object$_{P3}$, object$_{P4}$, objectp$_{P5}$, and object$_P$) in the cluster 920 each have at least METADATA$_{10}$, METADATA$_{12}$, METADATA$_{13}$, and METADATA$_P$ associated therewith. The object$_{P1}$ 950 also comprises METADATA$_{11}$.

Figure 10:
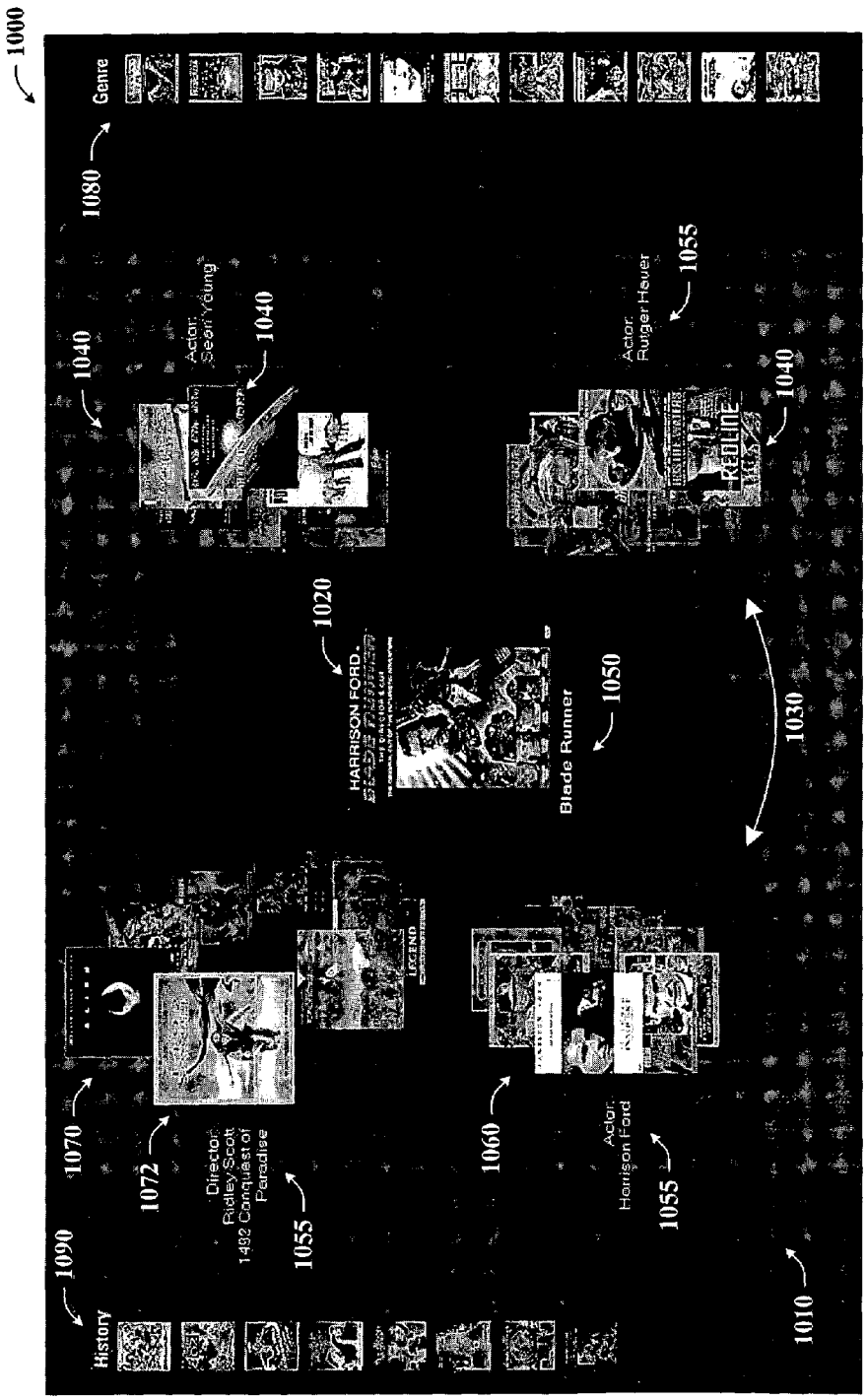
FIG. 10 illustrates an exemplary user interface in accordance with one specific implementation of the subject invention.

The methodologies and user interfaces as described hereinabove can be employed in a wide range of user applications, depending on the user's needs and/or desires. FIGS. 9 and 10 demonstrate a mere sampling of applications that the present invention may be applied to in order to illustrate its many practical uses and functionality in nearly all, if not all, scenarios involving searching, accessing and/or browsing for a desired object(s) or item(s).

Figure 11:
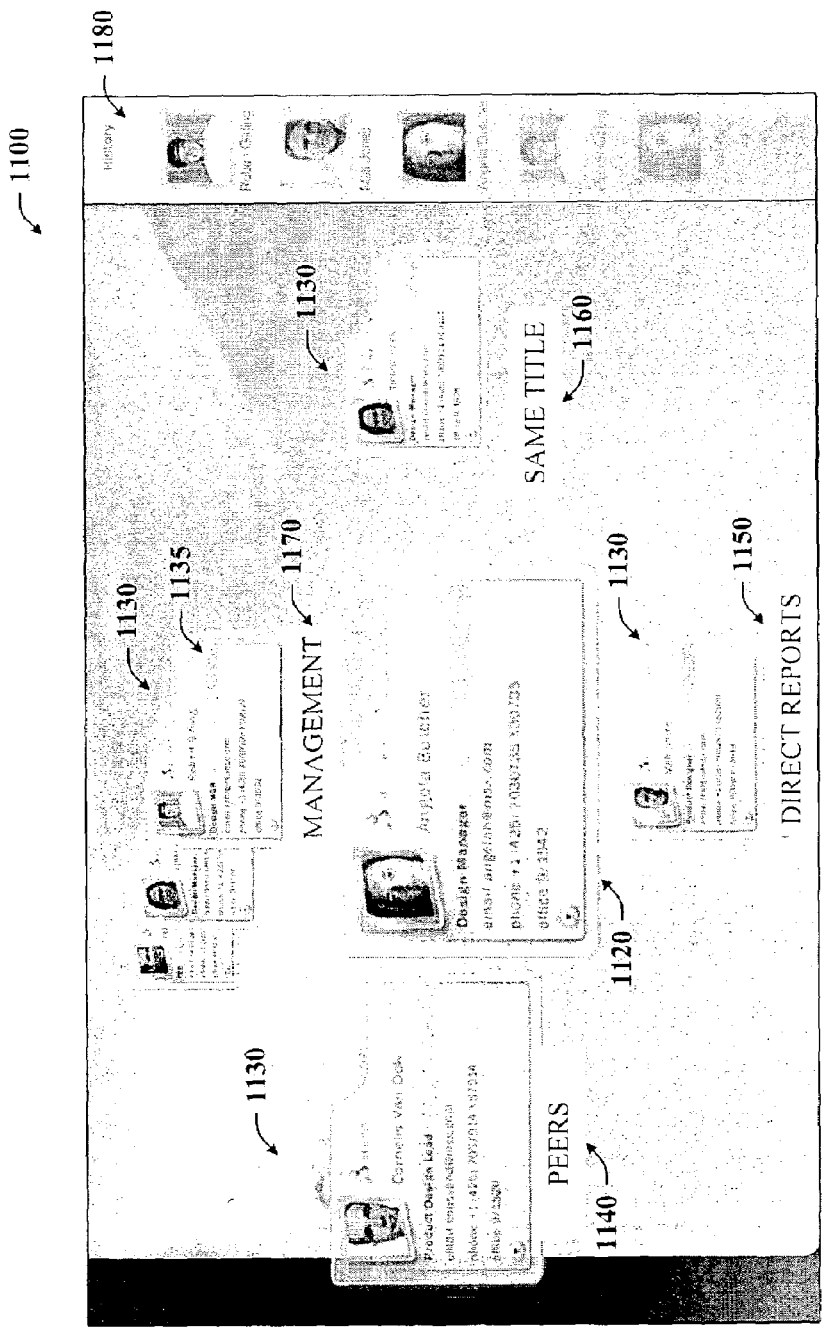
FIG. 11 illustrates an exemplary user interface in accordance with one specific implementation of the subject invention.

Referring now to FIGS. 10 and 11, there are illustrated exemplary user interfaces that facilitate accessing and browsing movie/actor/actress/director-related objects in accordance with an aspect of the present invention.

FIG. 10 depicts a user interface 1000 comprises a display screen 1010, a center object of focus 1020 located centrally with respect to other items represented on the display screen 1010, and four elliptical clusters 1030 of objects 1040 placed peripherally to the center object 1020. The center object depicts (by movie cover) a movie entitled Blade Runner as indicated by a center identifier 1050. The center identifier 1050 indicates the metadata or metadata class as represented by the center object 1020. The center object 1020 as shown involves "Blade Runner" metadata as opposed to "Harrison Ford" metadata and the like. Therefore, clusters 1030 should relate to "Blade Runner" by an Nth degree of separation.

As illustrated in the figure, cluster metadata 1055 for each displayed cluster 1030 relate to the "Blade Runner" metadata. For example, cluster 1060 includes other movies in which Harrison Ford appeared as an actor ("Harrison Ford" metadata). Hence, a relationship or degree of separation exists between the center object 1020 and the cluster 1060 as evidenced by Harrison Ford—who was an actor in Blade Runner as well. In essence, the clusters 1030 individually expand on an attribute of the center object 1020. Similar observations can be made with respect to the other clusters as well.

When an individual cluster is being browsed (e.g., moused over), as in cluster 1070, its viewable size is increased relative to the other clusters to make better use of the display real estate. During browsing, a front most object 1072 is outlined with an off-color border to identify it as the front most object 1072 and to indicate that it is can be selected. The objects behind the front most object 1072 gradually blend into the background as can be seen in the figure.

The user interface 1000 also comprises a seed listing 1080 entitled "genre" comprising a plurality of seeds each depicting a different movie genre. The user may want to shift his/her focus and such can be accomplished by choosing one of the displayed seeds 1080. Selecting one of the genre seeds causes a new center object of focus to be displayed along with a corresponding set of related clusters.

Finally, a history 1090 is included on the display 1000 which can be used by the user to track and/or recall previous centers of focus and/or the related clusters and/or previous searches conducted. The objects contained in the history can be arranged in chronological order in either an ascending or descending arrangement. Furthermore, objects in the history component are available for selection by the user. In one instance, the user decides to resume or return to a previous focus and in doing so, selects an object from the history 1090. In a second instance, the user wants to determine the degree of separation between his initial focus and his final focus. Other instances for wanting to employ the history 1090 can be imagined and such are contemplated to fall within the scope of the present invention. The corresponding peripheral clusters can be displayed as they were previously to recreate a previous search/browse event performed by the user.

FIG. 11 illustrates another exemplary user interface for a different application of the subject invention. In FIG. 11, a user interface 1100 is shown as employed in connection with a "people browser", functionality. This user interface 1100 facilitates accessing and browsing through people-related objects such as, for example, those included on an address list database, those included on an employee list database, and the like. More specifically, the user interface 1100 can be employed to browse and display a hierarchal arrangement of employees, for example, as shown herein.

The user interface 1100 comprises a display screen 1110 that displays a center object of focus 1120 and one or more related clusters 1130 of objects (one or more objects). Here, the objects 1135 in each cluster 1130 are in the form of index-like cards (e.g., contact card) organized into an elliptical array. When moused over, the clusters 1130 individually rotate either forward or backward about an axis such that cards behind a front most card gradually fade into the background. The direction of the rotation of each cluster depends on the position of the mouse or pointing device.

The cards have metadata (e.g., intrinsic and extrinsic) associated therewith such as name, title, email address, phone number, office address, status (e.g., at work, online, away, offline, etc.) as well as a picture of the person named. Additional metadata or information about the person can be included on or associated with the cards but generally is "hidden" or minimized to make better use of screen real estate.

In FIG. 11, the center object 1120 corresponds to any employee selected and/or of interest to a user; for example. "Angela Butcher". Other clusters 1130 of people bearing some relationship (direct and/or indirect) to Angela Butcher are organized around her according to a hierarchal arrangement. For example, employees in peer positions ("peers" 1140) are included in one cluster to the left of Angela, employees who directly report to Angela ("direct reports") are arranged in a cluster 1150 below her 1120, employees having a similar title ("same title" 1160) are located to the right of her 1120, and a management chain ("management" 1170) to whom Angela reports are located above her 1120. Though not shown in the figure, a seed listing such as described above in FIG. 10 can also be employed. In FIG. 11, the seeds can correspond to departments, product groups, position levels, positions within the company, for instance.

Finally, the exemplary user interface 1100 includes a history 1180 that records and/or maintains a list of previous objects of focus. Metadata relating to a date the respective objects were accessed and/or browsed can be attached to the respective objects and saved in their respective databases. This type of metadata can facilitate subsequent search requests for objects accessed on a particular date, for example. Optionally objects in the history can be removed manually and/or automatically based at least in part upon user preferences.

In sum, the respective clusters 1140, 1150, 1160, 1170 are arranged and/or organized with respect to the center object 1120 according to the respective metadata associated with each object and/or cluster. The hierarchal arrangement depicted herein is similar to organizing the clusters by the weight or strength of correlation of their respective metadata relative to the center object metadata. Moreover, the physical arrangement or display of the clusters with respect to the center object facilitates demonstrating a relationship between the center object 1120 and one or more clusters 1130 and provides the user quick and easy access to related objects, or in this case, to related people according to an organization/hierarchy tree.

Figure 12:
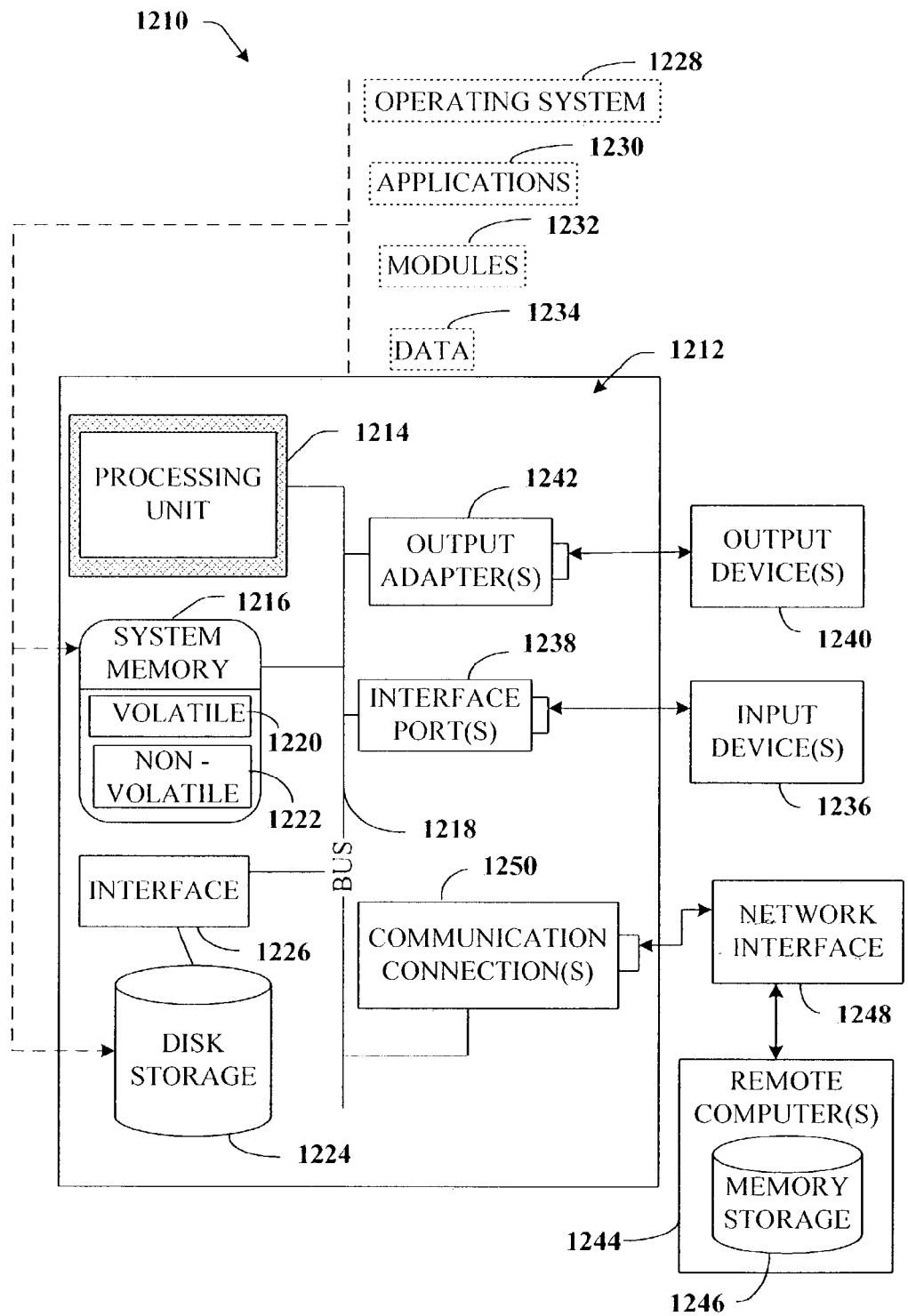
FIG. 12 illustrates an exemplary environment for implementing various aspects of the invention.

To provide additional context for various aspects of the present invention, FIG. 12 and the following discussion are intended to provide a brief, general description of a suitable operating environment 1210 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM) enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-110 drive, flash memory card, or memory stick. In addition, disk storage 1224 can include storage media separately or in combination with other storage media including but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems. ISDN adapters, and Ethernet cards.

What has been described above includes examples of the present invention. It is, of course, not possible to describe every conceivable combination of components or methodologies for purposes of describing the present invention, but one of ordinary skill in the alt may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates displaying objects comprising:
    an input component that receives an input regarding a first object;
    a relationship component that receives data regarding the first object and determines a plurality of other objects related to the first object; and
    a display component that concurrently displays the first object with a subset of the other objects, the subset of the other objects having metadata in common with the first object, the display component arranges the related objects into a plurality of clusters around the first object, the respective clusters being organized based at least in part upon common metadata shared between the related objects.

2. The system of claim 1 further comprising an artificial intelligence component that infers an appropriate subset of related objects to display.

3. The system of claim 2, the AI component comprising at least one of neural networks, expert systems, Bayesian belief networks, SVMs, hidden Markov Models, and fuzzy logic.

4. The system of claim 2, the AI component being implicitly trained via observing user behavior in connection with browsing among related objects with respect to the first object.

5. The system of claim 1, wherein the input regarding the first object is based at least in part upon user-based instruction.

6. The system of claim 1, further comprising one or more databases coupled to the relationship component, wherein the relationship component accesses objects related to the first object from the one or more databases by examining metadata associated with the respective objects included in the one or more databases.

7. The system of claim 1, wherein one or more metadata fields are assigned a weight.

8. The system of claim 7, wherein the display component renders the first object and the plurality of clusters of related objects based at least in part upon any one of user instruction and each respective cluster's degree of relatedness to the first object.

9. A computer employing the system of claim 1.

10. A computer readable medium having stored thereon the computer executable components of claim 1.

11. A method that facilitates accessing objects, comprising:

receiving a first object for rendering, the object having metadata associated therewith;
    displaying the first object; and
    displaying a plurality of additional objects concurrently with the first object, the additional objects having metadata related to the metadata of the first object, the metadata having a plurality of classes and the additional objects being displayed as clusters of the objects, the clusters being defined based upon the respective classes.

12. The method of claim 11, further comprising browsing the plurality of additional objects with respect to the first object, the first object being a center of focus.

13. The method of claim 11, further comprising selecting one of the plurality of additional objects whereby the selected object becomes a second object for rendering, the second object replacing the first object to become a new center of focus; displaying the second object; and displaying a plurality of additional objects with the second object, the additional objects having metadata related to the metadata of the second object.

14. The method of claim 13, the second object has metadata associated therewith.

15. The method of claim 14, the second object has at least one metadata in common with the metadata of the first object.

16. The method of claim 11, receiving a first item for rendering comprises at least one of a user-based search request and a user-based selection.

17. The method of claim 11, the objects are stored in one or more databases from which they are received and accessed for displaying to a user.

18. The method of claim 11, the first object is displayed centrally on a display screen.

19. The method of claim 11, the clusters of additional objects are displayed peripheral to the first object.

20. The method of claim 11, the metadata comprises at least one of intrinsic metadata and extrinsic metadata.

21. The method of claim 11, the classes of metadata are based at least in part upon user input.

22. The method of claim 11, the displaying of the first object is a function of available display space.

23. The method of claim 11, displaying the plurality of additional objects comprises organizing the classes of metadata into clusters of related objects in one or more locations around the first object.

24. The method of claim 23, the location of the respective clusters is a function of strength of correlation of metadata associated with the clusters and metadata associated with the first object.

25. The method of claim 11, further comprising mousing over one cluster of objects to browse the objects therein.

26. The method of claim 25, the moused over cluster is enlarged relative to the other clusters to facilitate browsing of the one cluster.

27. The method of claim 11, further comprising moving the first object to a historical component when at least one of a new center of focus and a second object are selected to replace the first object thereby allowing a user to recall previous at least one of previous objects of focus and one or more clusters of objects related thereto.

28. A method that facilitates accessing objects, comprising:
    receiving a first object for rendering, the object having metadata associated therewith; displaying the first object; and displaying a plurality of additional objects concurrently with the first object, the additional objects having metadata related to the metadata of the first object, the display of the respective additional objects being a function of strength of correlation of respective metadata with the first metadata, the plurality of additional objects being arranged into a plurality of clusters around the first object, the respective clusters being organized based at least in part upon common metadata shared between the additional objects.

29. The method of claim 28, a location of at least one of the displayed additional objects being a function of the correlation of respective metadata with the first metadata.

30. The method of claim 29, a depth location of at least one of the displayed additional objects being a function of the correlation of respective metadata with the first metadata.

31. The method of claim 29, a relative size of at least one of the displayed additional objects being a function of the correlation of respective metadata with the first metadata.

32. The method of claim 28, the first object being a center of focus.

33. The method of claim 28, further comprising selecting one of the plurality of additional objects whereby the selected object becomes a second object for rendering, the second object replacing the first object to become a new center of focus; displaying the second object; and displaying a plurality of additional objects with the second object, the additional objects having metadata related to the metadata of the second object.

34. The method of claim 33, the second object having metadata associated therewith.

35. The method of claim 34, the second object having at least one metadata in common with the metadata of the first object.

36. The method of claim 28, receiving a first item for rendering comprising at least one of a user-based search request and a user-based selection.

37. The method of claim 28, at least one of the first object and the additional objects being stored in one or more databases from which they are received and accessed for displaying to a user.

38. The method of claim 28, the first object being displayed centrally on a display screen.

39. The method of claim 28, the clusters of additional objects being displayed peripheral to the first object.

40. The method of claim 28, the metadata comprising at least one of intrinsic metadata and extrinsic metadata.

41. The method of claim 28, the classes of metadata being based at least in part upon user input.

42. The method of claim 28, the displaying of the first object being a function of available display space.

43. The method of claim 28, displaying the plurality of additional objects comprising organizing the classes of metadata into clusters of related objects in one or more locations around the first object.

44. The method of claim 28, further comprising mousing over one cluster of objects to browse the objects therein.

45. The method of claim 44, the moused over cluster being enlarged relative to the other clusters to facilitate browsing of the one cluster.

46. The method of claim 28, further comprising moving the first object to a historical component when at least one of a new center of focus and a second object are selected to replace the first object thereby allowing a user to recall at least one of previous objects of focus and one or more clusters of objects related thereto.

47. A user interface that facilitates browsing objects comprising:
   an object of locus positioned centrally in a display area, the object of focus comprising metadata;
   a plurality clusters of objects positioned in peripheral areas of the display area and surrounding the object of focus, the a plurality clusters of objects comprising at least one metadata in common with the metadata of the first object; and
   a search input component that facilitates determining the first object.

48. The user interface of claim 47, further comprising a historical component that maintains a list of the objects of focus.

49. The user interface of claim 47, further comprising one or more seeds populated at least in part according to the metadata of the object of focus, the one or more seeds being related to the metadata of the object of focus.

50. A data packet adapted to be transmitted between two or more computer processes facilitating accessing objects, the data packet comprising: information associated with receiving and displaying a first object, displaying and clustering a plurality of additional objects into a plurality of clusters that are accessed from one or more databases, the plurality of additional objects having metadata at least in part in common with metadata associated with the first object, the clustering being defined based at least in part upon metadata associated with the plurality of additional objects.

51. A computer readable medium having stored thereon the method of claim 11.

52. A system that facilitates accessing objects, comprising:
   means for receiving a first object for rendering, the object having metadata associated therewith;
   means for displaying the first object; and
   means for displaying a plurality of additional objects concurrently with the first object, the additional objects having metadata related to the metadata of the first object, the metadata having a plurality of classes and the additional objects being displayed as clusters of the objects, the clusters being defined based upon the respective classes.

* * * * *